United States Patent Office 3,039,006
Patented June 12, 1962

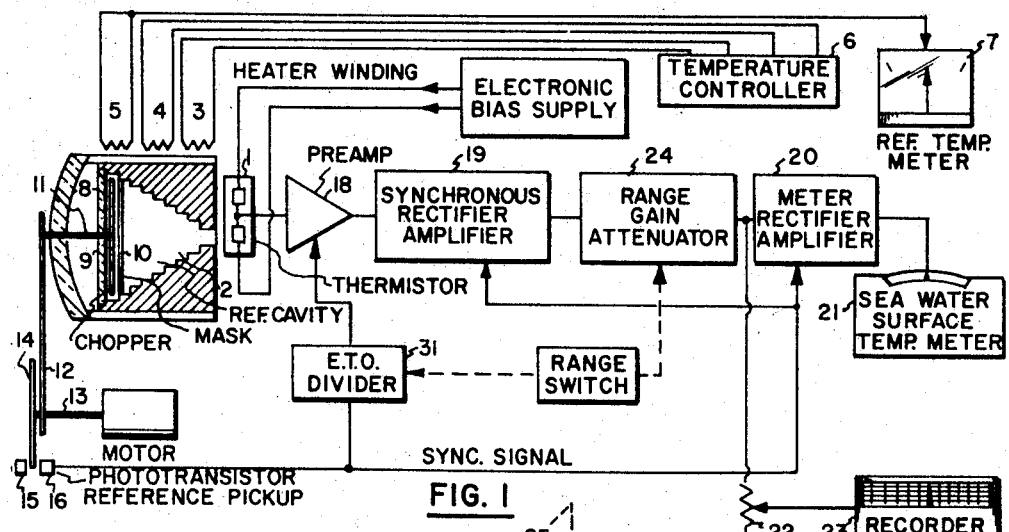
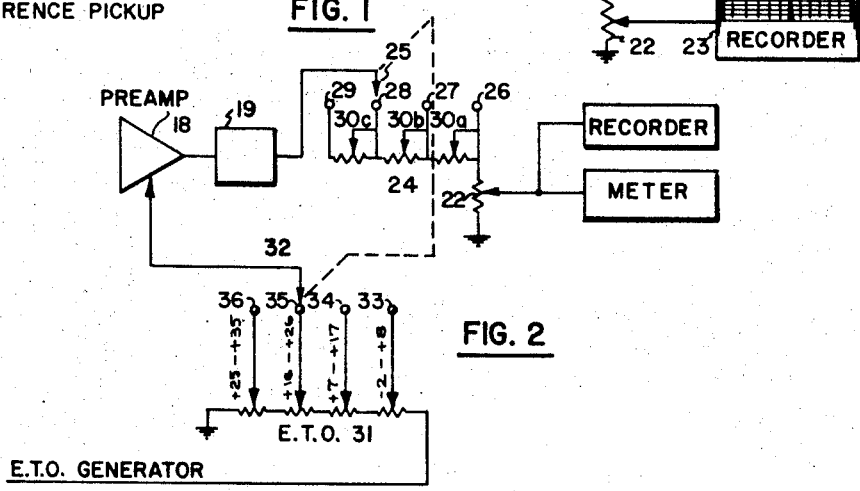
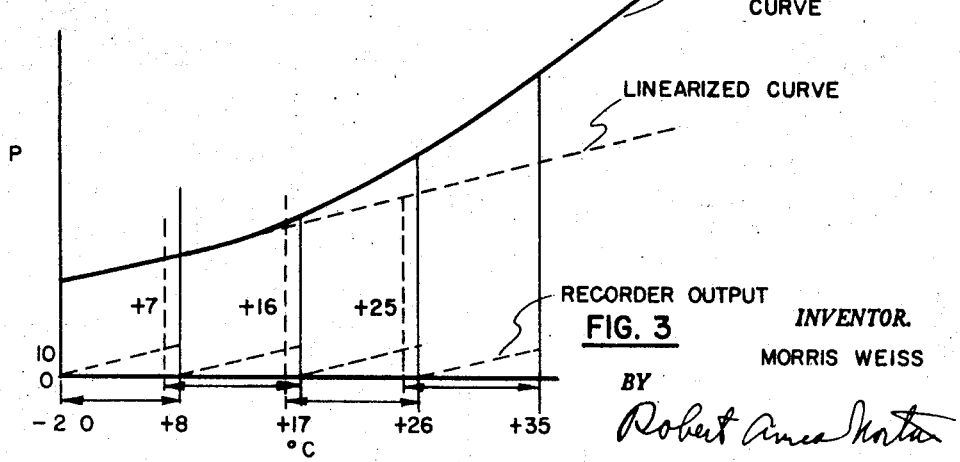
INVENTOR.
MORRIS WEISS

3,039,006
RADIOMETERS WITH LINEARIZED FINAL OUTPUT
Morris Weiss, Stamford, Conn., assignor to Barnes Engineering Company, Stamford, Conn., a corporation of Delaware
Filed Sept. 26, 1960, Ser. No. 58,473
3 Claims. (Cl. 250—233)

This invention relates to a multirange linear output processing system for transforming the signals from radiation detectors of the electric transducer type producing a nonlinear output into a series of linear output ranges.

A serious problem is presented by many instruments using a radiation detector of the electric transducer type having a highly nonlinear output. The detectors may transform radiation directly into electric currents or voltages or they may do so by intervening mechanism. The net result as far as the solution of the problems by the present invention is precisely the same. Many radiation phenomena are exponential or involve a relation in which a higher power of the variable appears. One of the most common such types of instruments is where radiation is effected by temperature. The response is highly nonlinear as for many cases it is proportional to the fourth power of the absolute temperature. Other types of radiation instruments are those which measure concentrations of components by spectral absorption in which case the variable is an exponent of $e$. Since the present invention is essentially one dealing with the electronic processing circuits and indicators it is not concerned with the particular form of radiation or radiation detector although of course the nature of the signal will determine the calibration and the parameters of the circuits used.

Essentially the present invention breaks up the highly nonlinear curve of detector output into a series of regions in each of which the curve can be approximated within the accuracy desired, by a straight line. This is, however, not enough because each area requires a straight line approximation of different slope. The invention therefore further includes a change of circuit gain so that all slopes are made the same and finally an offsetting signal is introduced in each range beginning the range at the same output level permitting the use of the same meter, recorder or other readout instrument. By means of the present invention it is possible to measure detector outputs throughout a wide range at a very high and substantially equal accuracy. This great increase in accuracy and convenience is obtained by the use of comparatively simple circuit elements of low cost and of high reliability. It is also an advantage of the present invention that in many cases circuits or functions already present in the electronic amplifying and processing circuits are used for accomplishing the purposes or part of the purposes of the present invention with simple and minor modifications.

It should be understood that the present invention uses circuits and circuit components which are not new to the science of electronics. It is the new organization of known types of circuits and circuit components which performs the new result and constitutes the combination of the present invention. No special complicated electronic design problems are encountered and this is an advantage of the invention. Of course, since in almost every case the invention will be incorporated in an instrument of high precision the same quality must be present in the electronic circuits but this is true in any event and is not aggravated by the incorporation of the present invention.

In describing a typical working instrument which illustrates the present invention a telethermometer or radiometer for the precision measurement of the temperatures of extended surfaces such as sea water, will be described. Because of the temperature of the surface the radiations used are infrared but as pointed out above the particular nature of the radiations forms no part of the present invention and the example chosen is merely a typical application of the present invention where the radiation detector signal response is highly nonlinear, approximating a function involving the fourth power of the absolute temperature. The invention will be specifically described also in connection with the drawings in which:

FIG. 1 is a diagrammatic representation of a radiometer optical head and block diagram representation of the processing circuits;

FIG. 2 is a detailed partial schematic of portions of FIG. 1, and

FIG. 3 is a series of curves of final output response.

The sea water radiometer is provided with an optical head. The detector is shown diagrammatically as a thermistor bolometer 1 with an active flake and a comparison flake. The active flake is located to receive radiation from the apex of a conical black body reference cavity 2 which is maintained by heater winding 3 at a constant temperature, in the instrument illustrated approximately 50° C. Two resistance thermometers 4 and 5 are provided, the first turning the heating wire current on and off by means of a conventional temperature controller circuit 6 and the latter shows black body temperature on a meter 7.

Radiation enters the instrument through a fast germanium doublet lens 8. The second element of the lens forms a cover for the reference cavity and so its surface is at cavity temperature which minimizes effects of lens emission. The radiation passes through a mask 10 of four quadrants, two solid and two open. In front of the mask is a rotating chopper 9 with blades also in the form of two quadrants. The sides of the chopper blades seen by the detector are gold plated to constitute effective infrared mirrors. The chopper is driven by a shaft 11 through a central hole in the germanium lens and in turn is driven from a motor driven shaft 13 through a belt 12. The shaft 13 also carries a disk with spaced openings through which a reference lamp 15 shines onto a phototransistor 16. The result is to chop incoming radiation at a frequency suitable for the detector response, for example 20 c.p.s., and the openings on the disc 14 are likewise arranged so that the phototransistor puts out a square wave at chopping frequency and in phase with the chopping blades.

The thermistor flakes are biased in the conventional manner by an A.C. or D.C. bias (not shown). The differential output between the active flake and the compensating flake is then fed into a preamplifier 18 of conventional design. As the instrument is of high precision, the preamplifier is designed for low noise and high stability. The amplified signals are then passed into a synchronous rectifier amplifier 19 which is also of conventional design. The output then passes through range gain attenuator 24 and the usual meter rectifier-amplifier 20 and produces indications on a D.C. meter 21. The rectified signal also passes into potentiometer 22 from which it actuates the recorder 23 which is also of conventional design.

The square wave from the phototransistor 16 performs two functions. First it performs the usual function in the synchronous rectifier amplifier of rectifying the signal of the preamplifier. The same signal, or as will appear from a more detailed description below a portion thereof, is also used as an electronic temperature offset (ETO), to the preamplifier. It is introduced out of phase to the triangular wave of the input to the preamplifier from the detector and offsets a portion thereof.

FIG. 2 shows the modifications which are required to perform the functions of the present invention. These modifications are simply a two deck range switch. The output from the synchronous detector amplifier is led to the moving arm 25 of the range switch and is fed at different points along a resistance network 24 by means of the contacts 26, 27, 28 and 29. The latter three contacts are each connected to moving arms (30a, b and c) which serve for adjustment. Putting it another way the resistance 24 may be considered as made up of three potentiometers in series.

The ETO signal from the phototransistor pickup 16 is introduced into a resistor 31 which is made up of four potentiometers with moving arms 33, 34, 35 and 36 connected to switch contacts. A moving arm 32 of the range switch, ganged to the arm 25, serves as a connection from the switch points to the preamplifier 18 to inject various amounts of ETO into it.

The operation of the instrument which illustrates the functioning of the present invention is shown in FIG. 3. The ordinates are output and the abscissae temperatures. As variation in detector output with variation of temperature of sea water is approximately proportional to the fourth power of the absolute temperature, the actual detector output curve will be seen to be highly nonlinear. The whole region from −2° C. to +35° C., which is the range of the particular instrument illustrated, is broken up into four portions, each of 10° C., this is shown by the solid vertical lines. The starts of the last three ranges are shown in dotted lines as there is provided a 1° C. overlap for each range. The first range approximates a straight line of the slope shown by the dashed lines designated "linearized curve." Over this range, therefore, a linear response of the readout instruments is an adequate approximation. A corresponding straight line for the next range would have a much steeper slope and the same is true successively for the other ranges. Also, each range starts at a higher level than the preceding one.

The function of the ETO deck of the range switch will now be described. The moving arm 33 is adjusted until the amount of ETO injected into the preamplifier 18 brings the level of the curve down to the zero level of the meter and recorder input. This adjustment is then locked. Then a similar adjustment is made successively with the potentiometer arms 34, 35 and 36 to bring the starting levels for each range down to zero.

When the range switch arm 25 is on switch point 26 the response of the amplifiers and hence, meter and recorder, is made to correspond to the straight line approximation for the first zone from −2° C. to +8° C. by setting potentiometer 22. This is a straight line which has the slope of the linearized curve in FIG. 3. The temperature is raised and the switch is then turned to switch point 27 and the potentiometer arm 30a adjusted until the output slope is made equal to that of the linearized curve. The procedure is then repeated with the switch on switch points 28 and 29 setting potentiometers 30b and 30c respectively.

The final result is that by means of the range switch the whole range from −2° C. to 35° C. can be broken up into four ranges each starting from the same zero point and having responses, designated in FIG. 3 as "Recorder Output," of the same slope. As a result the meter 21 will give linear responses in each range and so a series of linear scales serve to give measurement in all four ranges. A similar set of linear scales is placed above the recorder 23 so that its position can be read off on the proper scale.

In practical operation of the instrument shown it is turned on, the black body cavity warmed up until it reads accurately its temperature on the meter 7. The instrument is, of course, mounted in an aircraft and is then pointed at the sea. This is effected normally by opening a shutter or other device which closes the instrument when not in use. The range switch is then turned until the meter 21 shows an indication that is not off scale. Let us assume that the sea water temperature was actually 20.2° C. In the third position of the range switch the meter would then show a reading on the scale labelled 16 to 26° C. and the recorder can be turned on. As the aircraft continues to fly, the temperature is instantly indicated on the meter and the recorder traces a line corresponding to the temperature. Let us now suppose that the aircraft flies over the portion of the sea surface where there is a very cold current with a temperature of 15.5° C. The meter will move down to the zero stop and the operator will switch to the next lower range. Again there will be an accurate reading and the recorder will continue a line which now has to be read on the next lower scale. The recorder may be provided with suitable indicating means to show to which scale the range switch is set. These indicating means can be supplied with the recorders.

It will be noted that the present invention applied only to the electronic amplifying and processing circuits and was not concerned with the nature of the radiation received by the detector or of the quantity of the measurement for which the radiation was used. An entirely different problem with different radiation and different design of radiation detector can be handled in exactly the same manner requiring only a different setting of the elements and in some cases a different choice of the number of ranges into which the whole measurement range is to be broken down.

Two types of output variation and offsetting signal are shown in the specific description. They are only typical. Thus, for example, the difference in gain which determines the slope of output can be effected by changing the gain in the amplifying circuits themselves instead of taking outputs from various portions of an output potentiometer. The operation of the device is exactly the same and the form of gain variation can be secured with any one of a number of well known circuit configurations. The simple output potentiometer shown is very rugged and reliable and in many instruments presents a real advantage.

Similarly the offsetting signal which brings each range back to zero need not be a square wave of fixed amplitude. It may be a D.C. voltage or an A.C. wave of different shape provided that it is suitable for offsetting purposes. Where a chopped radiation is used the square wave offsetting signal is very simply obtained from the chopping mechanism and is already needed for synchronous rectification. Therefore, in such cases it presents an advantage.

I claim:

1. A device for translating highly nonlinear outputs from a radiation detector of the electronic transducer type into a series of linear outputs of narrower range which comprises a series of electronic amplifying and processing circuits,
    (a) a series of selectable circuit gain components,
    (b) means for producing an offsetting signal,
    (c) means for introducing predetermined portions of said offsetting signal onto the electronic circuits and means for simultaneously switching in selected ones of said gain components, the offsetting signals and gain components producing ranges of output signals each starting at the same predetermined level and each having a predetermined linear slope.

2. A device according to claim 1 in which the output signal from the electronic circuits is introduced into an output resistor and the offsetting signal is likewise introduced into an input resistor and switching means simultaneously switching the output to predetermined portions of the output resistor and predetermined positions on the input resistors to the electronic circuits in a phase to effect offsetting.

3. A device according to claim 2 in which the radiation detector is provided with means for chopping the radiation at a predetermined frequency and means for generating a square wave of constant amplitude driven in synchronism and with the radiation chopping means in phase therewith said square wave constituting the offsetting signal.

(References on following page)

References Cited in the file of this patent

UNITED STATES PATENTS

| | | |
|---|---|---|
| 2,643,288 | Philpott | June 23, 1953 |
| 2,648,253 | Sweet | Aug. 11, 1953 |
| 2,761,072 | Wormser | Aug. 28, 1956 |
| 2,824,974 | Parsons | Feb. 25, 1958 |
| 2,941,085 | Cuff | June 14, 1960 |
| 3,012,197 | Peterson et al. | Dec. 5, 1961 |